Sept. 8, 1925.
E. D. TUBBS
1,552,656
FLEXIBLE SHAFT COUPLING
Filed March 13, 1924
2 Sheets-Sheet 1
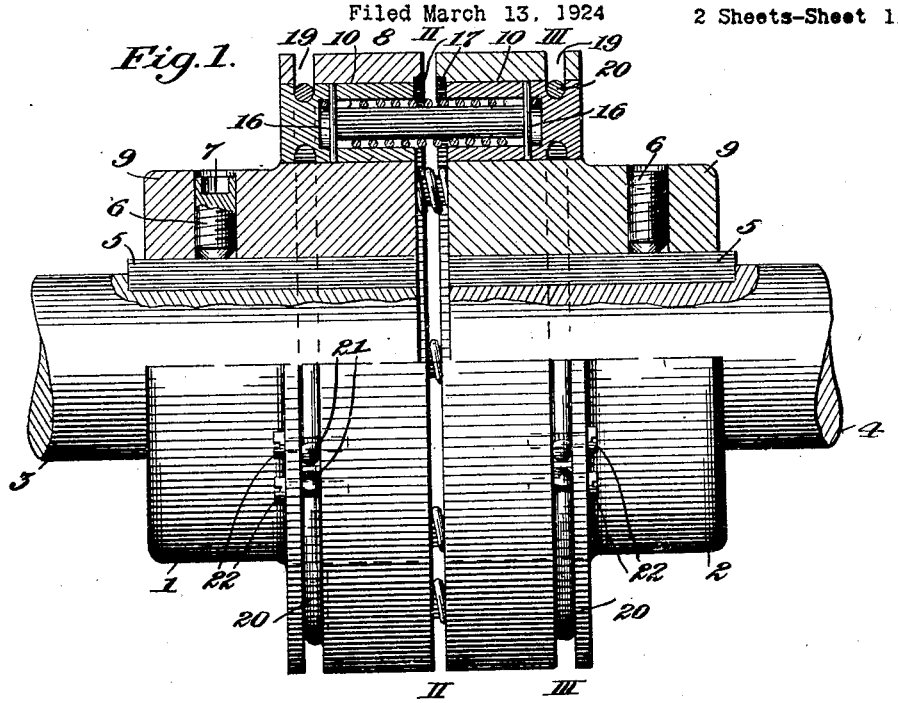
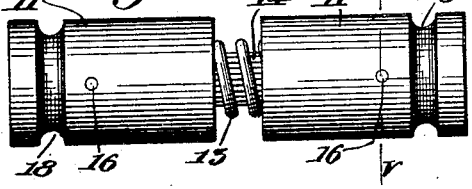
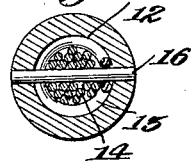
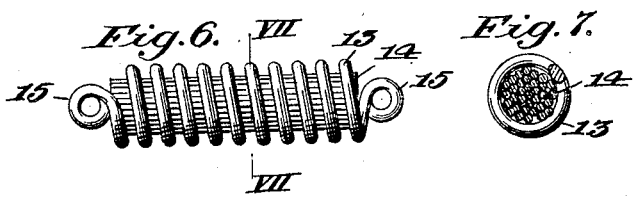
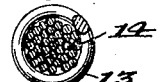
Inventor:
Earl D. Tubbs,
By Frederick V. Winters
Att'y.

Sept. 8, 1925.                                          1,552,656
                        E. D. TUBBS
                  FLEXIBLE SHAFT COUPLING
                   Filed March 13, 1924        2 Sheets-Sheet 2

Inventor:
Earl D. Tubbs,
By Frederick V. Winters
Att'y.

Patented Sept. 8, 1925.

1,552,656

UNITED STATES PATENT OFFICE.

EARL D. TUBBS, OF NEW YORK, N. Y., ASSIGNOR TO IGOE BROTHERS, OF NEWARK, NEW JERSEY, A CORPORATION OF NEW JERSEY.

FLEXIBLE SHAFT COUPLING.

Application filed March 13, 1924. Serial No. 698,947.

*To all whom it may concern:*

Be it known that I, EARL D. TUBBS, a citizen of the United States, and resident of New York, in the county and State of New York, have invented certain new and useful Improvements in Flexible Shaft Couplings, of which the following is a full, clear, and exact specification.

This invention relates to shaft couplings and has for its object to provide an improved flexible coupling, for connecting shafts which may become slightly out of line with each other. This invention is further designed as an improvement on that disclosed in United States Patent No. 1,469,738, issued to me on October 2, 1923. The present invention contemplates the provision of collars to be clamped upon the ends of the shafts to be connected and flexible means connecting the collars together to insure the rotation of said shafts in unison, even though they may be disposed slightly out of alinement with each other. A further object is to provide improved means for applying and detachably connecting said flexible means to said collars. Another object is to simplify the construction disclosed in my above mentioned patent. Other objects will appear as the description proceeds. The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation, partly in section, of a coupling constructed substantially in accordance with this invention and applied to the ends of two shafts.

Figure 4 is a detailed side elevation of one of the flexible connecting means used between the collars mounted on the shafts.

Figure 5 is a section on the line V—V of Figure 4.

Figure 6 is a detailed side elevation of the coiled spring and pack of wires constituting the filling for the socketed end members of the connecting devices illustrated in Figures 4 and 5, and Figure 7 is a section on the line VII—VII of Figure 6.

Figure 2:
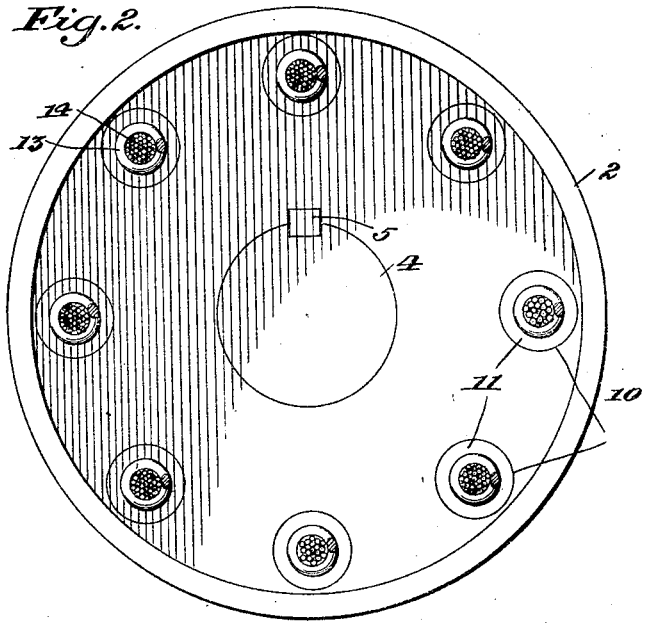
Figure 2 is a section on the line II—II of Figure 1.

Similarly constructed collars 1 and 2 are fastened to the ends of the shafts 3 and 4, respectively, by means of keys or splines 5 which are preferably clamped in position by set screws 6 adjustable radially in the collars. Said set screws are preferably provided with sockets 7, as shown in the left-hand one in Figure 1, to receive a socket wrench (not shown) for securing the desired adjustment of said set screws without having them protrude from the collars.

Figure 3:
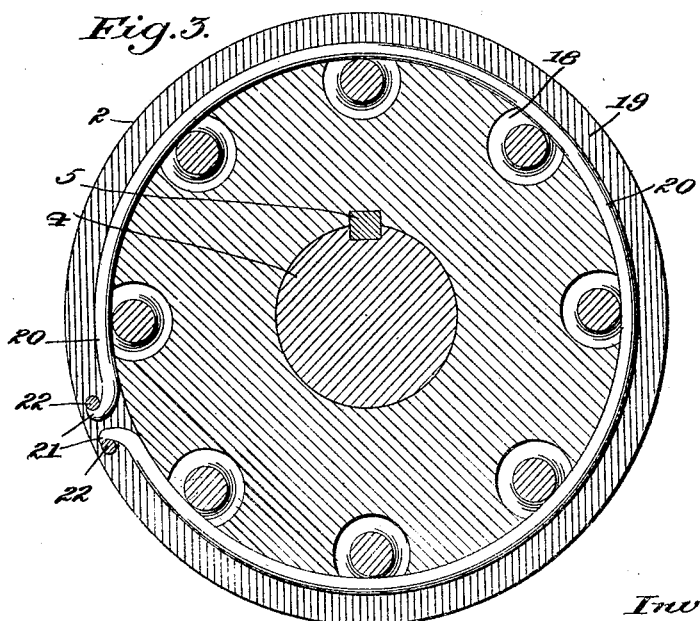
Figure 3 is a section on the line III—III of Figure 1.

The adjacent inner end portions 8 of the collars 1 and 2 are somewhat larger in diameter than their outer end portions 9 in which the set screws 6 are fitted, and through said larger inner end portions of the collars alined axial passages 10 are formed at intervals around the collars, eight such passages being shown in Figures 2 and 3. The collars 1 and 2 are flexibly connected by a plurality of coupling members like that illustrated in Figure 4, each of said members being inserted from either side of the collars into alined passages 10 therein, as clearly shown in Figure 1.

Each of said coupling members comprises two cylindrical end pieces 11 having sockets 12 in their inner ends, and a coiled spring 13 and bunch of wires 14 extending between said members 11 and having their end portions fitted in said sockets 12. The coiled spring 13 has eyes 15 formed at its ends and extending axially of the coupling. Transverse pins 16 are passed through the socket members 11 and said eyes 15 of the spring 13 for fastening said spring in place and securing the two socket members of the same coupling together. The space within the coiled spring 13 and between the pins 16 is snugly filled by the bundle of wires 14.

It will be noted that the adjacent faces of the collars 1 and 2 are spaced slightly apart, and said faces may be recessed at 17, Figure 1, to allow for a certain amount of movement by the coiled springs 13 and packs of wires 14 to permit the coupling to adjust itself to conditions when one of the shafts is slightly out of alinement with the other.

In order to detachably secure the flexible coupling members, illustrated in Figure 4, in place in the alined passages 10 of the collars 1 and 2, the cylindrical end members 11 of said couplings are formed with annular grooves 18, and the portions 8 of said collars are formed with grooves 19 to aline with said grooves 18 in the coupling members when the latter are in place, as shown in Figure 1, spring rings 20 being fitted in said grooves 19 so as to engage in the grooves 18 of the coupling members. The ends of said rings 20 may be hooked, as at 21, Figure 3, to engage retaining screws 22 extending across the grooves 19, whereby said spring rings will be held taut and prevented from flattening when the coupling is in use. In applying the rings 20, one hooked end 21 is first engaged with its retaining screw 22, and the other hooked end is subsequently sprung into engagement with the other retaining screw, as will be readily understood.

I claim:—

1. In a shaft coupling, the combination with collars adapted to be fixed on the shafts to be coupled, said collars having alined axial passages therein, of flexible coupling members each comprising socketed end memebrs fitted in alined passages in the collars, coiled springs extending between said end members and having their end portions fitted in the sockets thereon, said socketed end members having annular grooves formed therein, there being grooves formed in the collars to aline with said grooves in said end members, and rings seated in the grooves in the collars, and engaging the grooves in said end members for retaining the latter in the alined axial passages of the collars.

2. In a shaft coupling, the combination with collars adapted to be fixed on the shafts to be coupled, said collars having alined axial passages therein, of flexible coupling members each comprising socketed end members fitted in alined passages in the collars, coiled springs extending between said end members and having their end portions fitted in the sockets thereon, said socketed end members having annular grooves formed therein, there being grooves formed in the collars to aline with said grooves in said end members, and rings seated in the grooves in the collars, and engaging the grooves in said end members for retaining the latter in the alined axial passages of the collars, said rings having hooked ends, and retaining screws extending across the grooves in the collars for engaging said hooked ends of the rings and retaining the latter in place.

3. In a shaft coupling, the combination with collars adapted to be fixed on the shafts to be coupled, said collars having alined axial passages therein, of flexible connecting members, each comprising two socketed end members to fit in said alined passages, coiled springs extending between said end members and having their end portions fitted in the sockets thereof, and bundles of flexible reinforcing wires filling the coils of said springs and also extending between said end members with their end portions fitted in the sockets thereon.

4. In a shaft coupling, the combination with collars adapted to be fixed on the shafts to be coupled, said collars having alined axial passages therein, of flexible connecting members, each comprising two socketed end members to fit in said alined passages, coiled springs extending between said end members and having their end portions fitted in the sockets thereof, and bundles of flexible reinforcing wires filling the coils of said springs and also extending between said end members with their end portions fitted in the sockets thereon, the adjacent faces of the collars being recessed for the purpose specified.

In testimony whereof I have signed my name to this specification.

EARL D. TUBBS.